(12) United States Patent
Stafford et al.

(10) Patent No.: US 11,106,929 B2
(45) Date of Patent: Aug. 31, 2021

(54) FOVEATED OPTIMIZATION OF TV STREAMING AND RENDERING CONTENT ASSISTED BY PERSONAL DEVICES

(71) Applicant: Sony Interactive Entertainment Inc., Tokyo (JP)

(72) Inventors: Jeffrey R. Stafford, San Mateo, CA (US); Yutaka Yokokawa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 85 days.

(21) Appl. No.: 16/556,127

(22) Filed: Aug. 29, 2019

(65) Prior Publication Data

US 2021/0064904 A1 Mar. 4, 2021

(51) Int. Cl.
| | |
|---|---|
| *G06K 9/00* | (2006.01) |
| *G06K 9/32* | (2006.01) |
| *H04N 13/194* | (2018.01) |
| *H04N 13/161* | (2018.01) |
| *G06F 3/01* | (2006.01) |

(52) U.S. Cl.
CPC ........... *G06K 9/3233* (2013.01); *G06F 3/013* (2013.01); *H04N 13/161* (2018.05); *H04N 13/194* (2018.05)

(58) Field of Classification Search
CPC ........ H04N 7/50; H04N 7/30; H04N 7/26313; H04N 7/26106; H04N 7/26244; H04N 1/3935; H04N 1/393; H04N 13/194; G06T 3/40; G06T 3/4023; G06T 3/4007; G06K 9/3233
See application file for complete search history.

(56) References Cited

U.S. PATENT DOCUMENTS

| | | | | |
|---|---|---|---|---|
| 6,252,989 B1 * | 6/2001 | Geisler | ................ | H04N 19/176 345/555 |
| 6,985,158 B2 * | 1/2006 | Miller | ...................... | G06F 3/011 345/428 |
| 8,687,840 B2 * | 4/2014 | Samanta Singhar | . | G06F 1/3265 382/100 |
| 9,294,819 B2 * | 3/2016 | Lee | .................... | H04N 21/4622 |
| 9,996,250 B2 * | 6/2018 | Hata | ..................... | G06F 1/1681 |
| 10,560,680 B2 * | 2/2020 | Horvitz | .......... | H04N 21/234345 |
| 10,567,641 B1 * | 2/2020 | Rueckner | ............. | H04N 5/2257 |
| 10,643,307 B2 * | 5/2020 | Chen | ...................... | G06T 3/4046 |
| 10,848,768 B2 * | 11/2020 | Krishnan | ............. | H04N 19/167 |

(Continued)

OTHER PUBLICATIONS

Illahi et al., "Cloud gaming with foveated video encoding", ACM Feb. 2020.*

(Continued)

*Primary Examiner* — Amir Alavi
(74) *Attorney, Agent, or Firm* — John L. Rogitz

(57) ABSTRACT

A mobile device such as a mobile phone is used to image a nearby user for eye tracking at a closer range than would be provided by cameras on a display device such as a TV and send the eye tracking data to a server streaming video being presented on the display. The eye tracking data is used by the server to identify a region of interest (ROI) in the video, which is more highly compressed than regions outside the ROI to facilitate efficient compression of the video game image while preserving the quality of the ROI in the image where the user is looking.

21 Claims, 8 Drawing Sheets

(56) References Cited

U.S. PATENT DOCUMENTS

| | | | |
|---|---|---|---|
| 2005/0018911 A1* | 1/2005 | Deever | H04N 19/17 |
| | | | 382/232 |
| 2010/0110195 A1 | 5/2010 | McIntosh | |
| 2012/0272179 A1 | 10/2012 | Stafford | |
| 2014/0168056 A1 | 6/2014 | Swaminathan et al. | |
| 2014/0361977 A1 | 12/2014 | Stafford et al. | |
| 2015/0149956 A1* | 5/2015 | Kempinski | G06F 3/013 |
| | | | 715/784 |
| 2016/0078680 A1* | 3/2016 | Reif | G06F 1/163 |
| | | | 345/633 |
| 2017/0054987 A1* | 2/2017 | Rangarajan | H04L 67/02 |
| 2017/0285736 A1 | 10/2017 | Young et al. | |

OTHER PUBLICATIONS

Duchowski et al., "Foveated Gaze-Contingent Displays for Peripheral LOD Management, 3D Visualization, and Stereo Imaging." In: ACM Transactions on Multimedia Computing, Communications, and Applications (TOMM). Dec. 2007.

* cited by examiner

FOVEATED OPTIMIZATION OF TV STREAMING AND RENDERING CONTENT ASSISTED BY PERSONAL DEVICES

FIELD

The present application relates to technically inventive, non-routine solutions that are necessarily rooted in computer technology and that produce concrete technical improvements.

BACKGROUND

As recognized herein, services for streaming computer simulations such as computer games are required to compress, transport and decompress high resolution images (1080p, 4k, 8K, etc.) from video games originating from a remote server to a home console device within the severe bandwidth limitations typically imposed by a user's Internet service provider (ISP) and local network such as Wi-Fi. Although new video compression codecs are being developed to reduce the bandwidth requirements even for high resolution video, their efficiency is limited.

There are currently no adequate solutions to the foregoing computer-related, technological problem.

SUMMARY

As understood herein, knowing exactly where a user is looking when playing a streaming game on a TV would help to improve the efficiency of the video compression codec by adjusting the compression based within a Region of Interest (ROI) to be relatively low (or uncompressed) and the compression of the region outside the ROI to be relatively high, highly compressing the image to reduce its data size. To achieve this requires tracking of a user's gaze. However, as also understood herein, camera systems based on or near the TV are too far from the user to accurately track the user's gaze. In addition, there is a lot of variability of the distances of the TV to a user, making gaze tracking from such a distance more difficult.

The following solution addresses this problem for a user playing a streaming game or other video content on a display such as a TV.

Accordingly, a system includes at least one display such as but not limited to a TV display, at least one device with first and second cameras and positionable between the display and a user viewing the display, and at least one server configured to send compressed video for presentation on the display. The device is programmed with instructions that are executable to, using the first camera, generate a first image which includes an image of the TV display. The instructions further are executable to, using the second camera, generate a second image including an image of the user. The server and/or the device are programmed with instructions that are executable to identify a point of gaze (POG) of the user at the TV display using the images from the camera, and at least in part based on the POG, identify a region of interest (ROI) in the video. The server is programmed with instructions to compress the video and send the video for presentation on the TV display, such that the ROI is presented on the display in a higher resolution and/or higher quality than the area of the video outside the ROI.

In examples, the device includes a mobile communication device, or a tablet computer, or a video game controller, or regular prescription eyeglasses.

If desired, the server may be programmed with instructions to identify, in "N" frames of video, respective speculative ROIs at least in part using the ROI identified using the POG, wherein "N" is an integer greater than zero, and compress the "N" frames of video at least in part based on the respective speculative ROIs.

In another aspect, a system includes at least one processor and at least one computer memory that is not a transitory signal and that in turn includes instructions executable by the processor to image a user using a first camera on a device. The device is not on a display such as but not limited to a TV display. The instructions are executable to image the TV display using a second camera on the device, and based at least in part on the images, determine a point of gaze (POG) on the TV display. The instructions also are executable to send the POG to at least one remote server to facilitate the server using a region of interest (ROI) related to the POG in at least one video frame. The video frame also includes at least one area outside the ROI, such that the server can compress the ROI using a first compression and compress the area outside the ROI using a second compression.

Historical account of where the POG existed on a certain game screen could be stored in a database. Information in the database may be input to a machine learning algorithm to learn the correlation to the predicted ROI.

In another aspect, a method includes using a mobile device, generating an image of a user viewing a display such as but not limited to a TV display. The method also includes using the mobile device, generating an image of the TV display, and using the images, identifying a location on the TV display at which the user is looking. The method includes sending the location to at least one server over a wide area network.

The details of the present application, both as to its structure and operation, can best be understood in reference to the accompanying drawings, in which like reference numerals refer to like parts, and in which:

DETAILED DESCRIPTION

Figure 1:
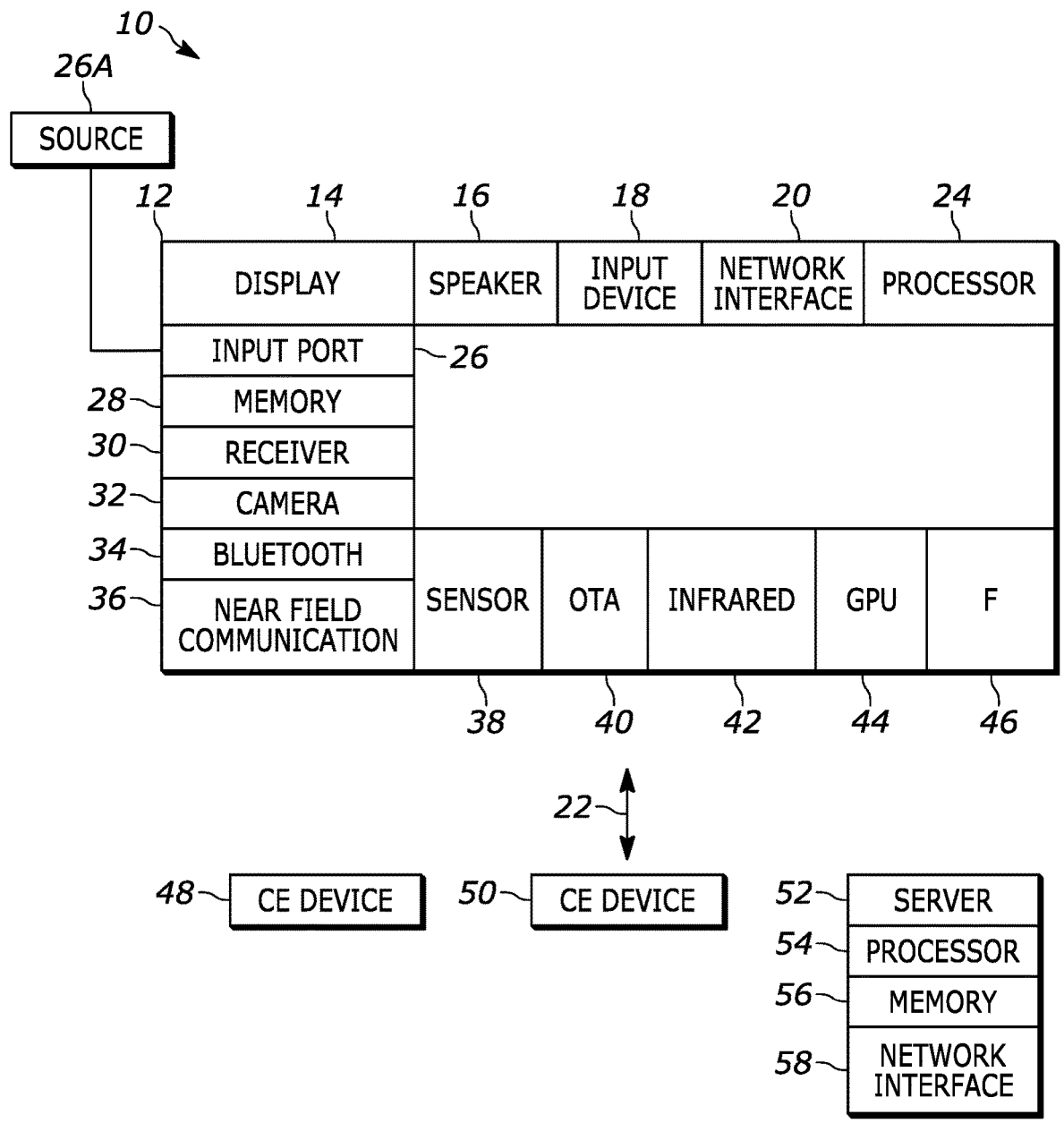
FIG. 1 is a block diagram of an example system consistent with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in all of the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown. The first device 48 may implement, for example, any of the devices discussed below including a mobile phone that can image a user, eyeglasses that can image a user, etc. The second device 50 may implement, for example, any of the devices discussed below including a computer simulation controller or console, examples of which include computer game controllers and consoles.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or, the server 52 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
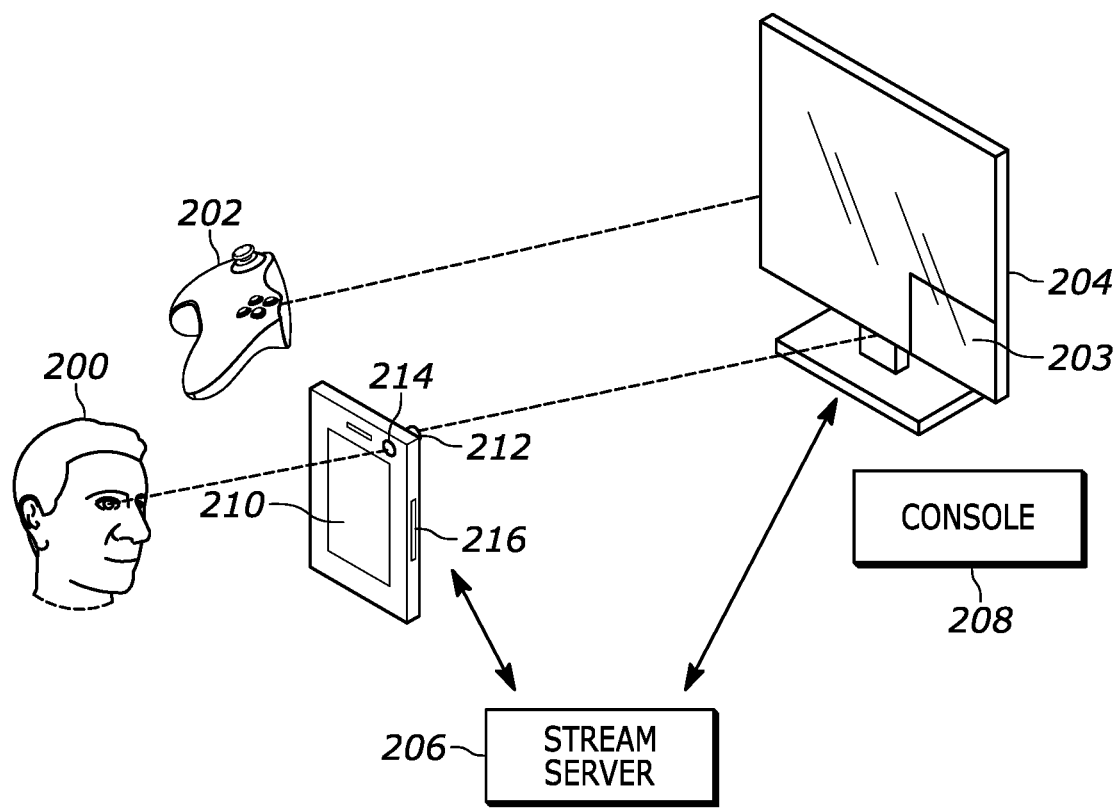
FIG. 2 is a schematic diagram illustrating an example system consistent with present principles.

FIG. 2 illustrates a system in which a user 200 views a display 204 such as a TV. More particularly, assume the user 200, who cannot focus on the entire display region, focuses on a portion 203 of the display region referred to herein as a region of interest (ROI).

The user 200 may employ a computer simulation controller 202, an example of which is a video game controller, to control a computer simulation such as a video game being presented on the display 204. It is to be understood that use of the terms "video game controller" and "video game" are for example only and do not imply loss of generality. The video game may be received from a remote server 206 over a wide area network such as the Internet, either directly by the display 204 or through a video game console 208. Present principles also apply to video received from a server, in addition to or in lieu of a video game. For disclosure purposes, video games will be used as an example.

A mobile device 210 such as a mobile telephone or tablet computer includes at least one and as shown preferably front-facing and rear-facing cameras 212, 214. The mobile device 210 may be oriented such that the front-facing camera 212 faces the display 204 to take images thereof, with the rear-facing camera facing the user 200 to image the user's eyes for eye tracking. Typically, the mobile device 210 also includes a position receiver 216. The mobile device 210 can communicate with the server 206 for purposes to be shortly disclosed. Note that the mobile device 210, server 206, display 204, console 208, and controller 202 may include some or all of the electronic components of the various devices shown in FIG. 1, as appropriate.

Figure 3:
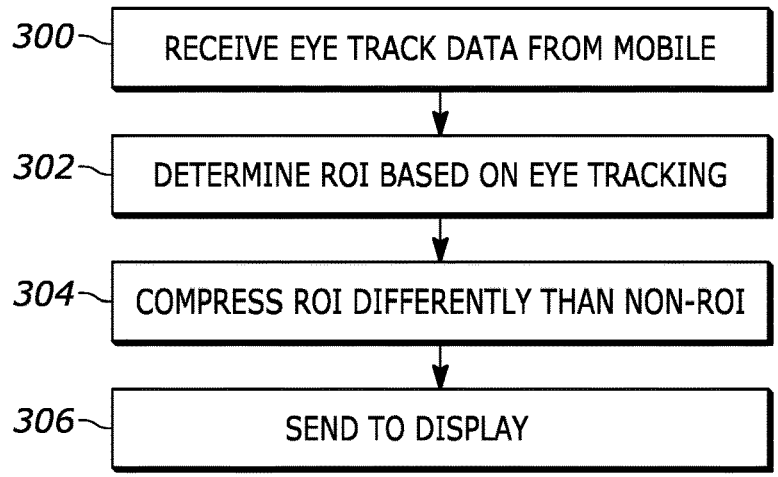
FIG. 3 is a flow chart of example overall logic consistent with present principles.

Turning now to FIG. 3, overall logic is shown that may be executed by one or more processors such as a processor in the mobile device 210 cooperating with a processor in the server 206. Commencing at block 300, images of the user's eyes are received from the rear-facing camera 214 of the mobile device 210 as eye tracking information. Moving to block 302, the location of the ROI 203 is determined based on the eye tracking information. This location is provided to the server 206, which at block 304 compresses regions in video that are to be presented outside the ROI more highly than regions of video that are to be presented within the ROI. In other words, the resolution and/or image quality of video in the ROI is higher than the resolution and/or image quality of video outside the ROI. The differentially compressed video is sent at block 306 for decoding (including decompression of the ROI and area of video outside the ROI) and presentation on the display 204.

Thus, by using the face and gaze tracking features of the mobile device 210, an application running on the mobile device 210 tracks the user's gaze at closer range than from the display 204, sending the eye tracking data to the server 206. The eye tracking data is used by the server to predict the user's gaze on the display 204 and therefore position an ROI for a video compression codec executed by the server, which enables more efficient compression of the video game image to preserve the quality of the image where the user is looking 203.

The user's mobile device 210 can be placed in close proximity to the user 200, e.g., on a coffee table or other nearby surface, significantly closer than the display 204.

As alluded to above, the mobile device 210 also images the display 204 using the front-facing camera 212. Using the image of the display 204, the mobile device 210 can identify the position and orientation (via computer vision techniques) of the display 204 in relation to the mobile device 210. As indicated at block 400 in FIG. 4, which provides further illustration, this operation may be performed during launch of an executable application on the mobile device and repeated if desired when one or more motion sensors in the mobile device indicate that the mobile device is moved.

Moving to block 402, the mobile device 210 images the display 204. Proceeding to block 404, using image recognition techniques employed by machine vision algorithms, based on the image of the display 204, and knowing the location of the mobile device 210 based on the position receiver 216 and the orientation of the mobile device based on one or more motion/orientation sensors in the mobile device 210 (such as any of the appropriate sensors shown in FIG. 1), the location of the display 204 relative to the mobile device 210 is determined.

Proceeding to block 406, the mobile device 210, using the camera 214, images the user 200 to essentially image the position and orientation (PnO) of the user's face using the camera image data, which may include red-green-blue data and/or depth data. Also using the image of the user 200, the position of the eyes of the user is determined.

Moving to block 408, the line of sight (LOS) of the user's gaze in relation to the face is determined using the image of the eyes from block 406. Block 410 indicates that the LOS is projected to the location of the display determined at block 404 to determine the point of gaze (POG) on the display 204 at which the user 200 is looking. The gaze direction of the user's eyes can be triangulated to the surface of the display 204 using previous PnOs in relation to the display. From this the point of the user's gaze (POG) can be determined within the frame of the display. The POG is sent to the server 206 at block 412, which may use the POG as the center of an ROI of given size. For example, a user sitting at an optimal viewing distance of about 1.93 meters away from a 50 inch TV with a 1920×1080 (Full HD) resolution, with a typical 5-degree high acuity fovea would project a ROI of about 168 mm diameter in size onto a region on the TV. This would be equal to about 4% region of interest in the entire full HD image. Allowing for some region to transition compression levels, over 80% of the image can be highly compressed, saving significant bandwidth.

Figure 4:
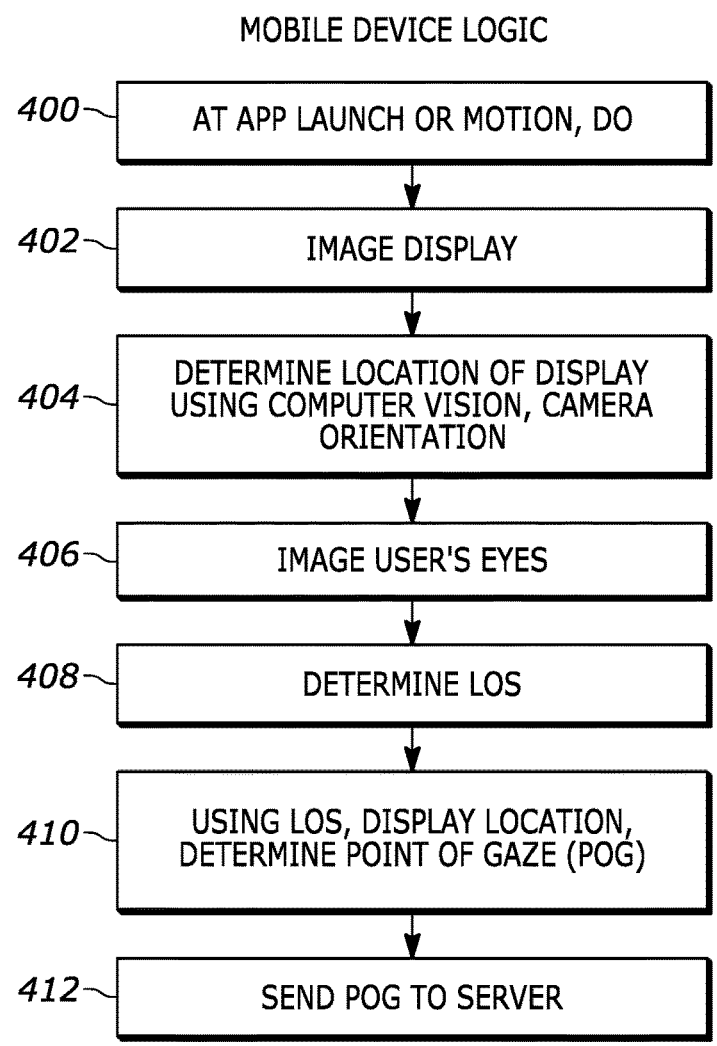
FIG. 4 is a flow chart of example mobile device logic consistent with present principles.

While FIG. 4 discusses a single user, the principles of FIG. 4 may be extended to multiple users, each having his or her own ROI in different regions of the display.

Figure 5:
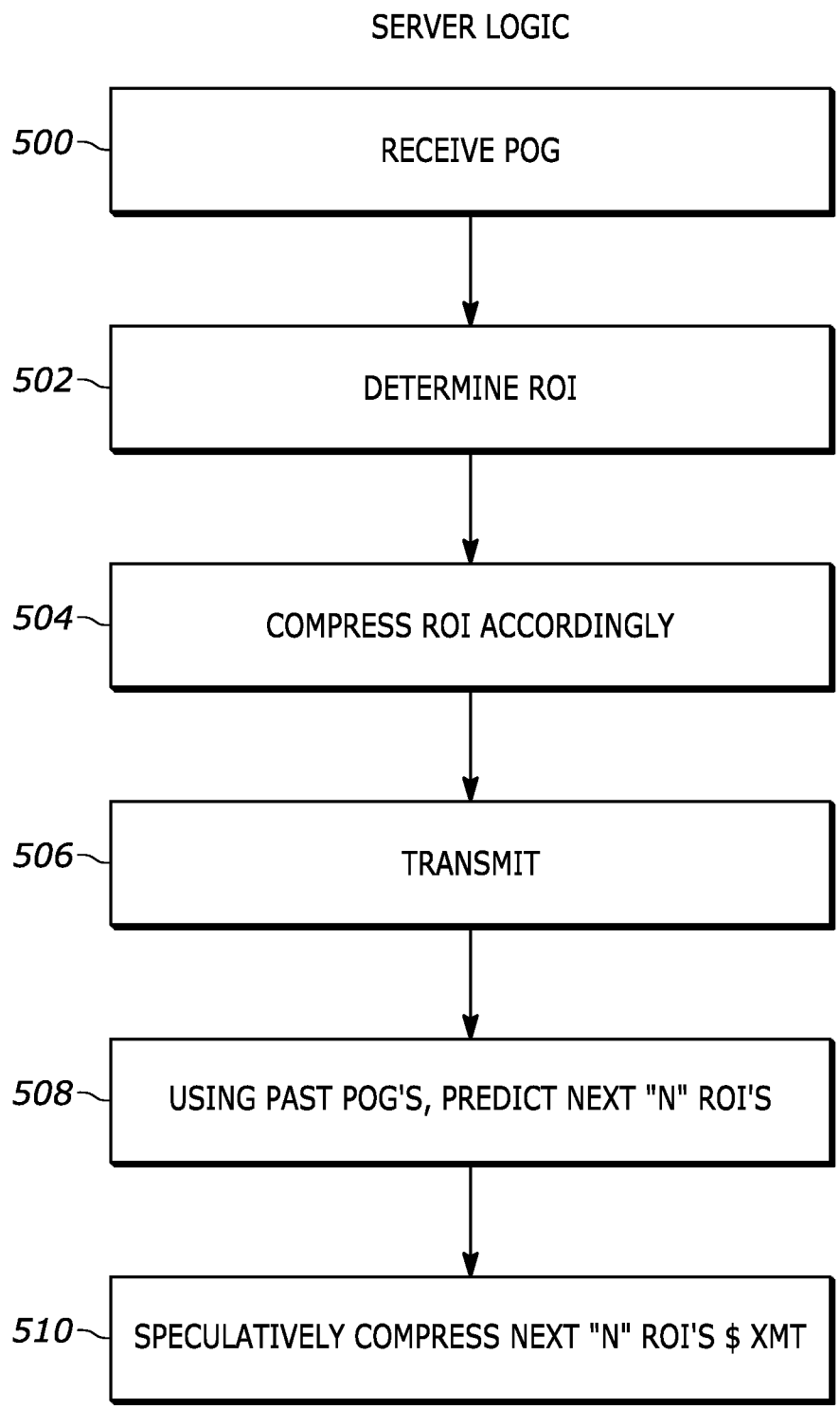
FIG. 5 is a flow chart of example server logic consistent with present principles.

FIG. 5 illustrates example server 206 logic. Commencing at block 500, the user's POG on the display 204 as determined in FIG. 4 is received from the mobile device 210. Moving to block 502, the ROI of the video is determined using the POG. In an example, the POG may be assumed to be the center of the ROI, and a predetermined area such as a group of a size of N×M pixels (or a circular area if desired with constant radius) that is centered on the POG may be determined to be the ROI of video to be compressed at block 504 to achieve higher resolution and/or image quality than a different compression of video regions outside the N×M pixels achieves. Thus, the video is transmitted at block 506 to the display 204 such that the region of video within the ROI is presented on the display 204 with a higher resolution and/or image quality than regions of video outside the ROI are displayed. It will readily be appreciated that the ROI is less than the entire video frame.

Present principles understand that latency exists in the system of FIG. 2 that should be accounted for. For example, the latencies include the tracking process on the mobile device 210, communication of the POG data from the mobile device 210 to the server 206, the processing and encoding by the server 206 of the video game image, the communication of the compressed video game image from the server 206 to the display 204 via system 208 in the home, and the decoding of the compressed video game image by the home system 208.

With this in mind, as indicated at block 508 in FIG. 5, the server 206 and/or mobile device 210 and/or the console 208 predicts "N" future points of gaze (and hence "N" future ROIs, "N" being an integer greater than zero) based on the current and previous eye POGs. When this process is executed by the server 206 and/or console 208 eye tracking data is additionally sent from the mobile device 210 to the server 206 and/or console 208. At block 510 the next "N"

frames of video following the current frame may be speculatively compressed using the locations of the "N" ROIs corresponding to the predications from block 508.

Predictive POG can be generated from the current application screen being displayed. A historical dataset of the application screen image and the observed POG may be accumulated. The POG from the current display screen may be predicted using machine learning, an example of which is a deep neural network.

Additionally, the resulting image of the decoder can be improved by processing the image through a machine learning filter which can dynamically up-sample the image to a better quality. Such an adaptive filter can be created by creating a historical dataset of the application screen and decoded result and training a convolutional deep neural network to recover the image.

Using the above solution, an improved game streaming service is provided that adapts better to a user's home internet bandwidth and gaze direction to the display showing the streaming game.

Figure 6:
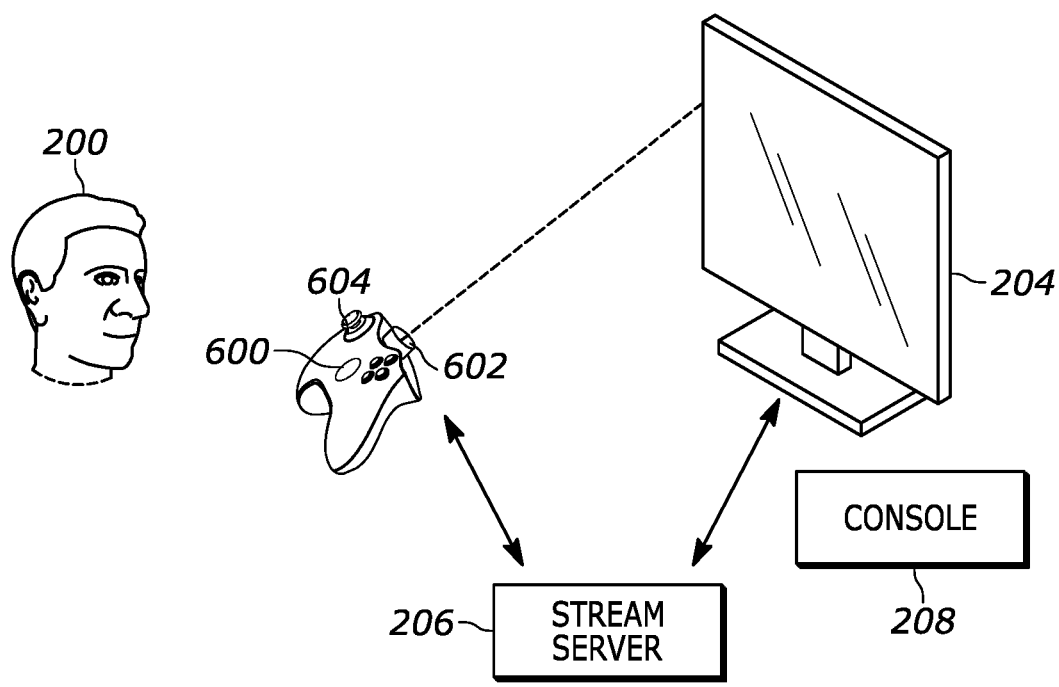
FIG. 6 is a schematic diagram of an alternate controller-based system consistent with present principles.

FIG. 6 illustrates a system substantially identical in configuration and operation to the system shown in FIG. 2, with the following exception. Instead of using cameras on a mobile device to image the user 200 and display 204, cameras 600, 602 on a video game controller 604 are used to track the position and orientation of the display 204 and face/eyes of the user 200 in relation to the controller 604. In this embodiment, one of the cameras 600, 602 can be angled up toward the user, and the user prompted to hold the controller in a designated way or orientation via instructions shown on display 204 provided by console 208.

Figure 7:
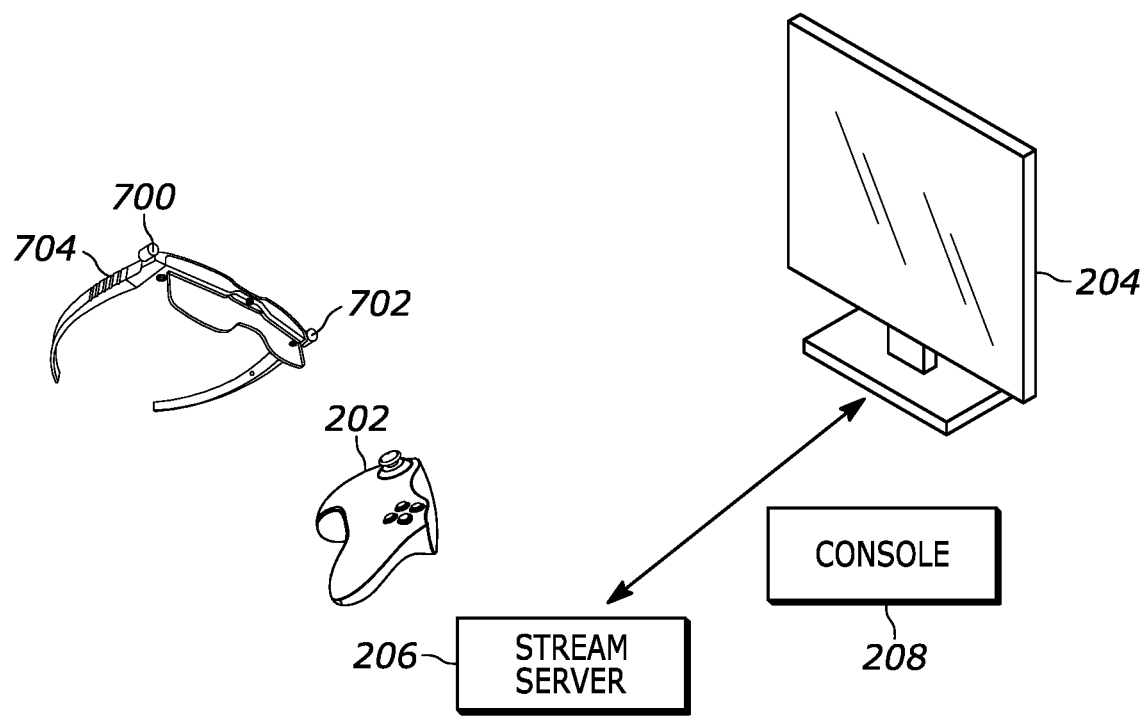
FIG. 7 is a schematic diagram of an alternate eyeglasses-based system consistent with present principles.

FIG. 7 shows yet another embodiment substantially identical in configuration and operation to the system shown in FIG. 2, with the following exception. Instead of using cameras on a mobile device to image the user 200 and display 204, cameras 700, 702 on eyeglasses 704 are used to track the position and orientation of the display 204 and face/eyes of the user 200 in relation to the eyeglasses 704.

Instead of streaming video images, native content running on the console 208 could incorporate Foveated rendering. In such an embodiment, the user's point of gaze (POG) is determined as described herein and the POG then used to identify regions of content outside the POG. For content in these regions, rendering resolution and/or quality and/or other aspects of the content is altered to reduce rendering cost on the console 208.

Figure 8:
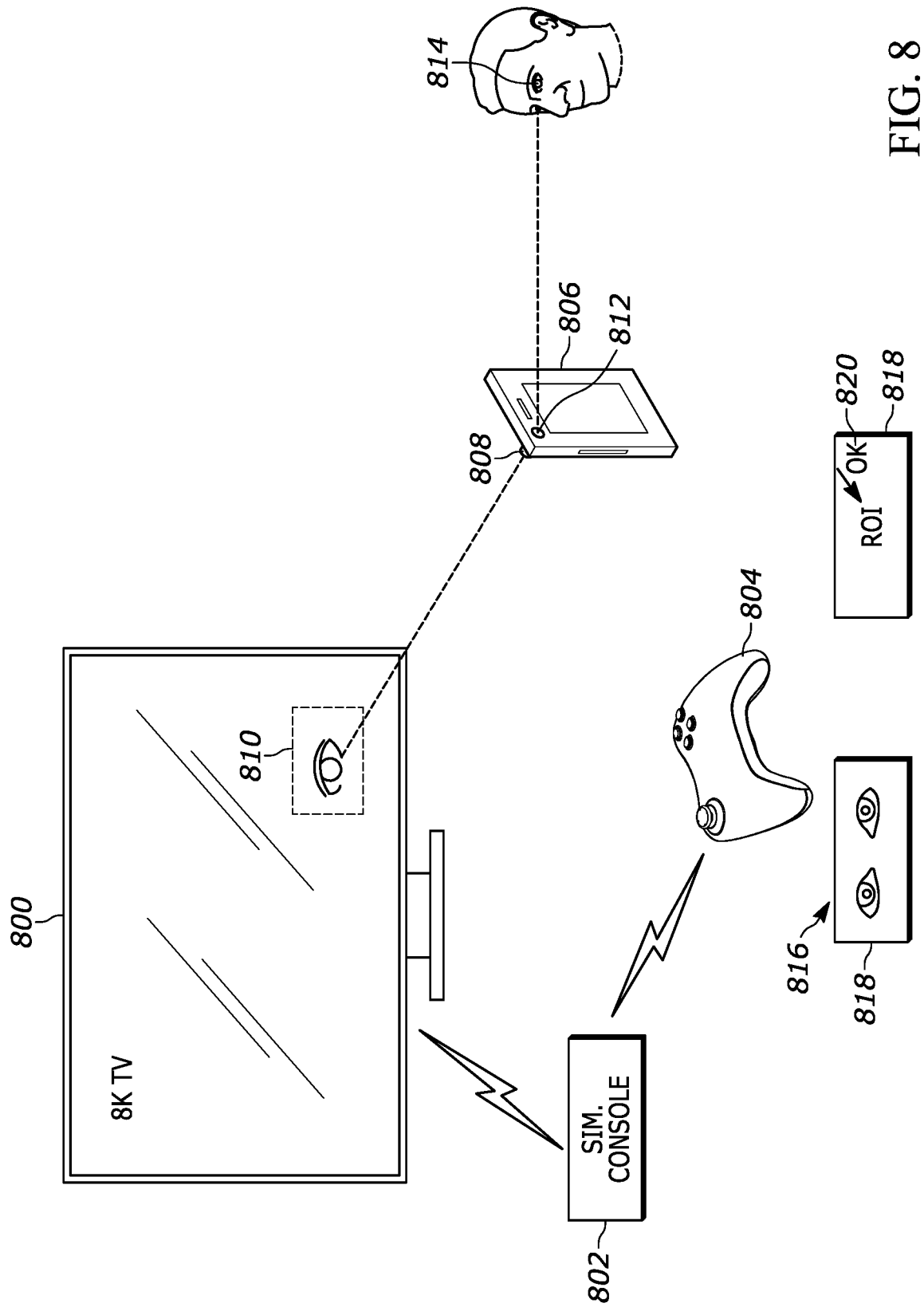
FIG. 8 is a schematic diagram illustrating present principles.

Now referring to FIG. 8, additional details of the mobile phone embodiment are shown. A display 800 such as but not limited to a large screen 8K TV display receives image information such as but not limited to video or images from a video game console 802. The video game console 802 may receive control information from a wireless video game controller 804. A mobile phone 806 may include a first camera 808 imaging a ROI 810 on the display 800 and a second camera 812 imaging eyes 814 of a user.

The above-described application on the phone 806 can prompt a user as to whether the user desires to play images on the display in the highest resolution or quality, and if so to angle the phone at a particular orientation, e.g., to point the camera 808 directly at the display 800. As shown at 816 in FIG. 8, a display 818 of the mobile phone 806 may present an image of the user's face such as a silhouette or direct plan view of the face as the user moves the phone to present the best facial image possible. As shown at 820 in FIG. 8, the application can present on the phone display 818 and indication (such as "OK" and/or a check mark) indicating that the phone is oriented appropriately and that camera 812 is imaging the eyes 814 of the user. The same protocol may be used to ensure that the opposite camera 808 which images the display 800 is oriented properly.

Note that in the controller embodiment discussed above in relation to FIG. 6, the display 800 can give feedback on correct controller positioning for proper imaging. Or, the controller may include a speaker that gives audible feedback such as "hold the controller lower" or "can't see you" to prompt the user to re-orient the controller. Or, the controller may include a screen to present the confirmation views shown in FIG. 8.

The console 802 may communicate wirelessly with the phone 806. Communication may be over a local area network or via WiFi or other appropriate protocol. Example use cases include a display 800 that is very large and relatively distanced from the user, or a mobile tablet computer or laptop computer implementing the video display that is relatively close to the user.

Figure 9:
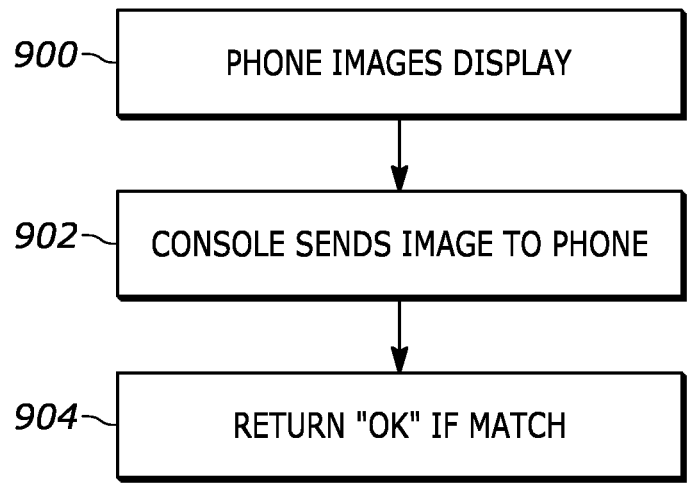
FIG. 9 is a flow chart of example logic illustrating further principles.

In some embodiments, visible markers may be inserted into the images on the display 800 such as bar codes or quick response (QR) codes indicating region location information to facilitate the application being executed on the phone 806 identifying screen regions with images from the camera 808. Or, as indicated in FIG. 9, the phone can image the display 800 at block 900 with the console 802 sending the image being sent to the display to the phone 806 as well at block 902. The phone can compare the two images from blocks 900 and 902 at block 904 to determine if they advantageously match, indicating that the phone is oriented correctly.

Present principles understand that in conditions of streaming a movie or game in high traffic networks, the image of the user may degrade. Accordingly, if the camera can't see the user's face or get the data to the system fast enough, the system can just revert to conventional lower resolution or lower image quality of the presented images. Alternatively, or in addition, the frame rate may decrease but resolution and or image quality is maintained, and then once eye tracking is recovered the selective compression techniques herein described can be implemented and the frame rate, and/or the perceived resolution, and/or image quality is increased.

Figure 10:
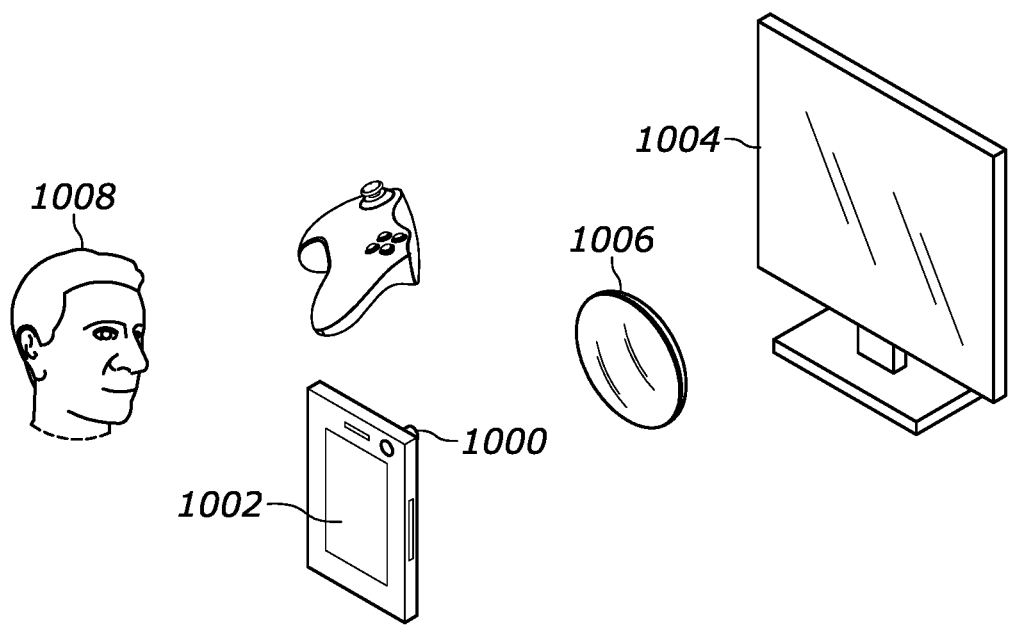
FIG. 10 is a schematic diagram of an alternate single-camera embodiment.

FIG. 10 shows that in embodiments with only a single, preferably high resolution, wide field of view camera 1000 on a mobile phone 1002 or other device, the single camera may be oriented toward a display 1004 and a mirror 1006 such as a convex mirror may be placed in front of the user 1008 to present a view for the wide field of view camera 1000 to also image the user via reflection from the mirror 1006. In this embodiment it should be understood that the PnO in relation to display 1004 of the mobile device 1002 is determined via methods previously described, but the PnO of the user 1008 face/eyes relative to mobile device 1002 may be determined by the approximate size and orientation measurements of the user 1008 face/eyes reflected in mirror 1006. Therefore, the processing logic used to process the images via computer vision techniques from camera 1000 attached to mobile device 1002, would assume the user 1008 face/eyes were mirrored and adjust the computer vision processing accordingly.

It will be appreciated that whilst present principals have been described with reference to some example embodiments, these are not intended to be limiting, and that various alternative arrangements may be used to implement the subject matter claimed here.

What is claimed is:

1. A system comprising:
at least one display;
at least one device comprising first and second cameras and positionable between the display and a user viewing the display;
at least one server configured to send compressed video for presentation on the display;
the device being programmed with instructions executable to:
using the first camera, generate a first image, the first image comprising an image of the display;
using the second camera, generate a second image, the second image comprising an image of the user;
the server and/or the device being programmed with instructions executable to:
identify a point of gaze (POG) of the user at the display based at least in part on the images from the first and second cameras;
at least in part based on the POG, identify a region of interest (ROI) in the video;
the server being programmed with instructions executable to:
compress the video and send the video for presentation on the display, the compression being such that the ROI is presented on the display in a higher resolution and/or image quality than area of the video outside the ROI.

2. The system of claim 1, wherein the device comprises a mobile communication device.

3. The system of claim 1, wherein the device comprises a tablet computer.

4. The system of claim 1, wherein the device comprises a computer simulation controller.

5. The system of claim 1, wherein the device comprises eyeglasses.

6. The system of claim 1, wherein the server is programmed with instructions to:
compress a frame of video in the ROI less highly than areas of the frame of video outside the ROI.

7. The system of claim 1, wherein the server is programmed with instructions to:
identify, in "N" frames of video, respective speculative ROIs at least in part using the ROI identified using the POG, wherein "N" is an integer greater than zero;
compress the "N" frames of video at least in part based on the respective speculative ROIs.

8. A system, comprising:
at least one processor;
at least one computer memory that is not a transitory signal and that comprises instructions executable by the at least one processor to:
image a user using a first camera on a device, the device not being on the display;
image the display using a second camera on the device;
based at least in part on the images, determine a point of gaze (POG) on the display; and
send the POG to at least one remote server to facilitate the server using a region of interest (ROI) related to the POG in at least one video frame, the at least one video frame also comprising at least one area outside the ROI, such that the server can compress the ROI using a first compression and compress the area outside the ROI using a second compression.

9. The system of claim 8, wherein the device comprises a mobile communication device.

10. The system of claim 8, wherein the device comprises a tablet computer.

11. The system of claim 8, wherein the device comprises a computer simulation controller.

12. The system of claim 8, wherein the device comprises eyeglasses.

13. The system of claim 8, comprising the server, the server being programmed with instructions to:
compress the ROI using the first compression and compress the area outside the ROI using the second compression.

14. The system of claim 13, wherein the server is programmed with instructions to:
identify, in "N" frames of video, respective speculative ROIs at least in part using the ROI identified using the POG, wherein "N" is an integer greater than zero;
compress the "N" frames of video at least in part based on the respective speculative ROIs.

15. A method comprising:
using a device, generating an image of a user viewing a display distanced from the device;
using the device, generating an image of the display;
using the images, identifying a location on the display at which the user is looking; and
sending the location to at least one server or to at least one computer simulation console over a network.

16. The method of claim 15, wherein the server or console is programmed with instructions to:
compress video and send the video for presentation on the display, the compression being such that video to be presented in the location on the display at which the user is looking is presented on the display in a higher resolution and/or image quality than video outside the location on the display at which the user is looking.

17. The method of claim 15, wherein the device comprises a mobile communication device.

18. The method of claim 15, wherein the device comprises a tablet computer.

19. The method of claim 15, wherein the device comprises a video game controller.

20. A method comprising:
using a mobile device, generating an image of a user viewing a display;
using the mobile device, generating an image of the display;
using the images, identifying a location on the display at which the user is looking; and
sending the location to at least one server or to at least one computer simulation console over a network, wherein the server or console is programmed with instructions to:
identify, in "N" frames of video, respective speculative regions of interest (ROIs) at least in part using the location on the display at which the user is looking, wherein "N" is an integer greater than zero;
compressing the "N" frames of video at least in part based on the respective speculative ROIs.

21. A method comprising:
using a mobile device, generating an image of a user viewing a display;
using the mobile device, generating an image of the display;
using the images, identifying a location on the display at which the user is looking; and
sending the location to at least one server or to at least one computer simulation console over a network, wherein the computer simulation console is programmed with instructions to:

determine a point of gaze toward the display; and
use the POG to reduce rendering resolution/quality of the presented video image outside of the POG.

* * * * *